US009870700B2

United States Patent
Priesterjahn et al.

(10) Patent No.: US 9,870,700 B2
(45) Date of Patent: Jan. 16, 2018

(54) METHOD AND DEVICE FOR AVOIDING FALSE ALARMS IN MONITORING SYSTEMS

(71) Applicant: WINCOR NIXDORF INTERNATIONAL GMBH, Paderborn (DE)

(72) Inventors: Steffen Priesterjahn, Paderborn (DE); Alexander Drichel, Bielefeld (DE)

(73) Assignee: Wincor Nixdorf International GmbH, Paderborn (DE)

( * ) Notice: Subject to any disclaimer, the term of this patent is extended or adjusted under 35 U.S.C. 154(b) by 332 days.

(21) Appl. No.: 14/596,391

(22) Filed: Jan. 14, 2015

(65) Prior Publication Data

US 2015/0206422 A1 Jul. 23, 2015

(30) Foreign Application Priority Data

Jan. 17, 2014 (EP) .................................. 14151578

(51) Int. Cl.
*H04N 7/18* (2006.01)
*G08B 29/18* (2006.01)
(Continued)

(52) U.S. Cl.
CPC ......... *G08B 29/185* (2013.01); *G07F 19/207* (2013.01); *G08B 13/19695* (2013.01); *H04N 7/183* (2013.01)

(58) Field of Classification Search
None
See application file for complete search history.

(56) References Cited

U.S. PATENT DOCUMENTS

2007/0036456 A1* 2/2007 Hooper .................. G06T 5/008
382/274
2009/0207246 A1* 8/2009 Inami .................... G01S 3/7864
348/135
(Continued)

FOREIGN PATENT DOCUMENTS

DE 201 02 477 5/2001
DE 203 18 489 3/2004
(Continued)

OTHER PUBLICATIONS

European Search Report dated Apr. 2, 1014.
(Continued)

*Primary Examiner* — Eileen Adams
(74) *Attorney, Agent, or Firm* — Black, McCuskey, Souers & Arbaugh, LPA

(57) ABSTRACT

A method is provided for avoiding false alarms on a self-service terminal, in particular an ATM. The ATM has at least one camera and at least one alarm unit that generates alarms when the ATM is attacked, and a network connection to a network to pass on the alarms to a customer. The method includes generating an alarm by the alarm unit and storing alarm images from the camera from which the alarm was derived; before passing on the alarm to an operator via a digital network, comparing the digital alarm images with templates stored on the ATM and that characterize a false alarm, and if a correlation with the templates is established, the alarm is ignored; otherwise the alarm is passed on to the consumer by the network.

22 Claims, 2 Drawing Sheets

(51) Int. Cl.
*G08B 13/196* (2006.01)
*G07F 19/00* (2006.01)

(56) References Cited

U.S. PATENT DOCUMENTS

| | | | |
|---|---|---|---|
| 2010/0026808 A1* | 2/2010 | Kagehiro | G07F 19/207 348/152 |
| 2011/0006112 A1 | 1/2011 | Mueller | |
| 2011/0134246 A1 | 6/2011 | Von Der Lippe et al. | |
| 2012/0038772 A1 | 2/2012 | Priesterjahn et al. | |
| 2012/0038773 A1 | 2/2012 | Priesterjahn et al. | |
| 2012/0038774 A1 | 2/2012 | Reimann et al. | |
| 2012/0173427 A1* | 7/2012 | Sparks | G06Q 20/40145 705/44 |
| 2013/0215266 A1 | 8/2013 | Trundle et al. | |

FOREIGN PATENT DOCUMENTS

| | | |
|---|---|---|
| DE | 10 2008 012 231 | 9/2009 |
| DE | 10 2008 039 688 | 3/2010 |
| DE | 10 2008 039 689 | 3/2010 |
| DE | 10 2009 018 319 | 10/2010 |
| DE | 10 2009 018 320 | 10/2010 |
| DE | 10 2009 018 322 | 10/2010 |
| DE | 10 2010 036 961 | 2/2012 |
| DE | 10 2010 060 624 | 5/2012 |
| DE | 10 2011 001 541 | 9/2012 |
| DE | 10 2010 036 350 | 1/2014 |
| GB | 2 351 585 | 1/2001 |
| WO | 2005/109315 | 11/2005 |
| WO | 2007/093977 | 8/2007 |

OTHER PUBLICATIONS

Megherbi et al.—"A Novel Face Recognition System Using the Binary Phase-Only Filter Via Optimal Correlation Thresholding"—SPIE vol. 5909, Sep. 16, 2005—59092C-1 to 59092C-11.

Krylov et al.—"Fast Super-Resolution from video data using optical flow estimation"—Signal Processing, 2008—pp. 853-856.

* cited by examiner

| PNG | serialized template data |

Fig. 2

METHOD AND DEVICE FOR AVOIDING FALSE ALARMS IN MONITORING SYSTEMS

BACKGROUND

1. Field of the Invention

The invention concerns a self-service terminal (ST) with a camera for detecting manipulation attempts and for avoiding false alarms. In particular, the invention concerns a self-service terminal configured as a cash dispenser or automated teller machine (ATM).

2. Description of the Related Art

In the field of self-service terminals, in particular ATMs, often criminal activity is carried out in the form of manipulations intended to extract sensitive data, in particular PINs (Personal Identification Numbers) and/or card numbers of users of the self-service terminal. In particular, manipulation attempts are known in which so-called skimming devices, such as for example keyboard overlays and similar, are illegally installed in the operating area or control region. Such keyboard overlays frequently have their own power supply and a processor, memory and operating program, so that an unwitting user is defrauded when entering his PIN or when inserting his bank card. The extracted data are then transmitted to a remote receiver via a transmitter integrated into the keyboard overlay, or are stored in the data memory present in the keyboard overlay. Many of the skimming devices found today are very difficult to distinguish with the human eye from original control elements (keyboard, card reader etc.).

To thwart such manipulation attempts, often monitoring systems are used with one or more cameras mounted in the area around the self-service terminal, which cover the entire control panel and frequently also the area where the user is standing. Such a solution is described for example in DE 201 02 477 U1. Using the camera monitoring there, both the control console itself and the area where the user stands in front of it can be monitored. To determine whether a person is present in this area, a further sensor is provided.

GB 2 351 585 A1 describes the self-service terminal formed as an ATM with a camera which is mounted above the screen and covers at least part of the control panel. The camera is oriented so that it covers the keyboard of the ATM. Consequently a self-service terminal is known which has a control panel and control elements arranged therein, wherein a camera for detecting manipulation attempts is mounted in a housing portion surrounding the control panel of the self-service terminal.

WO 2007/093977 A1 discloses a self-service terminal with a camera arrangement which is equipped with several cameras for monitoring the self-service terminal. To detect manipulation attempts on the self-service terminal which e.g. is an ATM, several cameras are mounted in the vicinity of the control panel of the ATM. One camera for example covers the card slot and a second camera the cash dispenser opening. A further camera is oriented onto the user of the ATM.

DE 203 18 489 U1 describes an ATM with a monitoring device which has two cameras (image recording elements 21 and 22 in FIG. 2). The one camera is oriented onto the user; the second camera is oriented onto the area of the cash dispenser opening or compartment.

WO 2005/109315 A1 describes an ATM with security system having a camera which is mounted outside the ATM and which covers the operating area of the ATM (ATM interface 22 in FIG. 1).

Alarm systems which work optically are furthermore known from DE 10 2008 012 231.9, DE 10 2008 039 689.3, DE 10 2008 039 688.5, DE 10 2009 018 322.1, DE 10 2009 018 319.1, DE 10 2009 018 320.5, DE 10 2010 036 350.2, DE 10 2010 036 961.6, DE 10 2010 060 624.3, DE 10 2011 001 541.8.

The problem however arises of false alarms which are triggered by the protection mechanisms.

The object of the invention is to reduce the probability of false alarms in the automatic monitoring of security-critical devices.

SUMMARY OF THE INVENTION

The invention allows the operator to react locally to specific circumstances and exclude false alarm causes on individual devices.

The method works with so-called templates which are derived from a false alarm. These contain all information on the alarm reported and can be stored manually in a database by the operator. The monitoring system then excludes the conditions shown in the templates as an alarm cause. In contrast to many other methods, the templates allow the operator to avoid false alarms without precise knowledge of the alarm detection process.

The templates themselves have a depiction for the operator which is easy to understand. In the case of video or image monitoring, these would for example be images which reflect the alarm status.

As well as a method, the invention concerns a self-service terminal, in particular an ATM, which has at least one camera, an alarm unit which generates alarms when the ATM is attacked, and a network connection to a network for passing on the alarms to a customer. The network can either be a private telephone connection via which data are exchanged, or an internal network, or a network which allows encryption within a public network. Different network interfaces are taken into account, such as ethernet or dedicated point-to-point analog or digital telephone connections. Furthermore the ATM comprises at least one camera which is normally oriented at the control units of the ATM. These control units may be card readers with the corresponding insertion points, or keypads or touch-sensitive screens. Normally an ATM has several cameras so one camera may be oriented at the user, a further camera may be directed at the keyboard or the input units, and a third camera may be oriented at the insertion point for the card reader. An alarm unit is provided in order to generate an alarm on the basis of behaviour patterns or specific image information from these cameras. For example, an alarm is generated if a surface change is detected which may give an indication of an illegal attachment for the card reader or an attachment for the keyboard. Also certain behaviour patterns may lead to alarms which can be depicted graphically. Because of different light conditions and reflections in different environments however, false alarms may occur which may be unit-specific and dependent on the point of installation. To be able to manage such false alarms individually for each ATM, the invention furthermore provides a device for avoiding false alarms which is configured, in the event of an alarm, to compare the alarm images from the camera from which the alarm was derived with templates which are stored on the ATM and which characterise a false alarm, and if a correlation with the templates can be established, to ignore the alarm; otherwise the alarm is passed on to a customer via the network connection and the network. The device for avoiding false alarms is preferably a combination of software and hardware placed on the operating system of the ATM. It cooperates with the further components of the ATM and is incorporated in the control process. The ATM may preferably be based on a conventional PC and is operated with an operating system such as Windows or Linux or Unix. In such a case, the device or apparatus for avoiding false alarms is constructed as a software module integrated in the apparatus. The device for avoiding a false alarm receives the alarm from the alarm module and checks the images generated by the alarm module against the templates representing a false alarm. Then an image comparison takes place in which both one image and a series of images, and whole videos, may be compared with each other. It is also conceivable that several images from different cameras are stored in a template. If no correlation can be established, the alarm is passed on via the network to the operator of the ATM or to a corresponding service point.

If the service point or operator now establishes that the alarm reported is a false alarm, then via an interface to the ATM, a reconfiguration of the ATM can be performed, in which the alarm images which have been generated are now converted into templates. Here a connection is established to the ATM via the network.

In one possible embodiment, the device for avoiding false alarms is configured, upon the instructions of the operator (remote instruction), to generate a template on the ATM if the customer or operator is of the opinion that the alarm is a false alarm that should be ignored in future, in order then to convert the alarm images on the ATM into templates to avoid a similar or the same alarm in the future.

The device for avoiding false alarms, on comparison of the digital alarm images with templates, may be configured to work with one or more of the following processes: a cross correlation CC, a normalised cross correlation NCC, a squared Euclidean distance SED, a normalised squared Euclidean distance NSED.

The device for avoiding false alarms may be configured to apply, in NSED, a blurring of the images in which a filter, preferably a Gaussian filter, can be used. Other algorithms that generate a certain fuzziness are also conceivable.

The templates may consist of image data and metadata. The metadata may comprise one or more of the following items of information:
a) information from the previously processed images
   aperture
   features calculated from the images
b) camera information
   serial number
   calibration at the area of interest,
   camera measurements
c) system information from the ATM
   type
   model description and serial number.

The features that are calculated from the images may be e.g. statistical features (brightness, contrast), image similarity, contour-based or segment-based features or other features, edge image, colour image and further preprocessed images. For this various methods can be used e.g. Euclidean distance, cross correlation etc.

The metadata and image data may be stored in a file that defines a template. Furthermore there are different types of templates, firstly automatically generated templates which were produced on configuration of the camera or ATM and serve for performance of camera adjustments and to provide comparison parameters for the further images. These reference templates also allow detection of whether manipulated templates have been introduced, or whether components such as cameras of the ATM have been exchanged. If this is detected, either an alarm may be generated or corresponding functions which would lead to multiple reception of alarms may be restricted.

The device for avoiding false alarms may be configured such that metadata are also used to influence the comparison. Thus for example the serial numbers of the templates may be compared with the serial number of the current alarm image, if this also comprises metadata, or with other metadata which have now been produced for the automatic templates. In this way it can be ensured that the camera is identical. Furthermore setting parameters of the camera may be compared with each other, such as the image region and aperture. Also information from the ATM itself may be stored in the template metadata, so that these can be scanned to ensure that templates from other ATM's have not been falsely introduced into the ATM.

BRIEF DESCRIPTION OF THE DRAWINGS

FIG. 2 shows the structure of a template.

DETAILED DESCRIPTION

Figure 1:
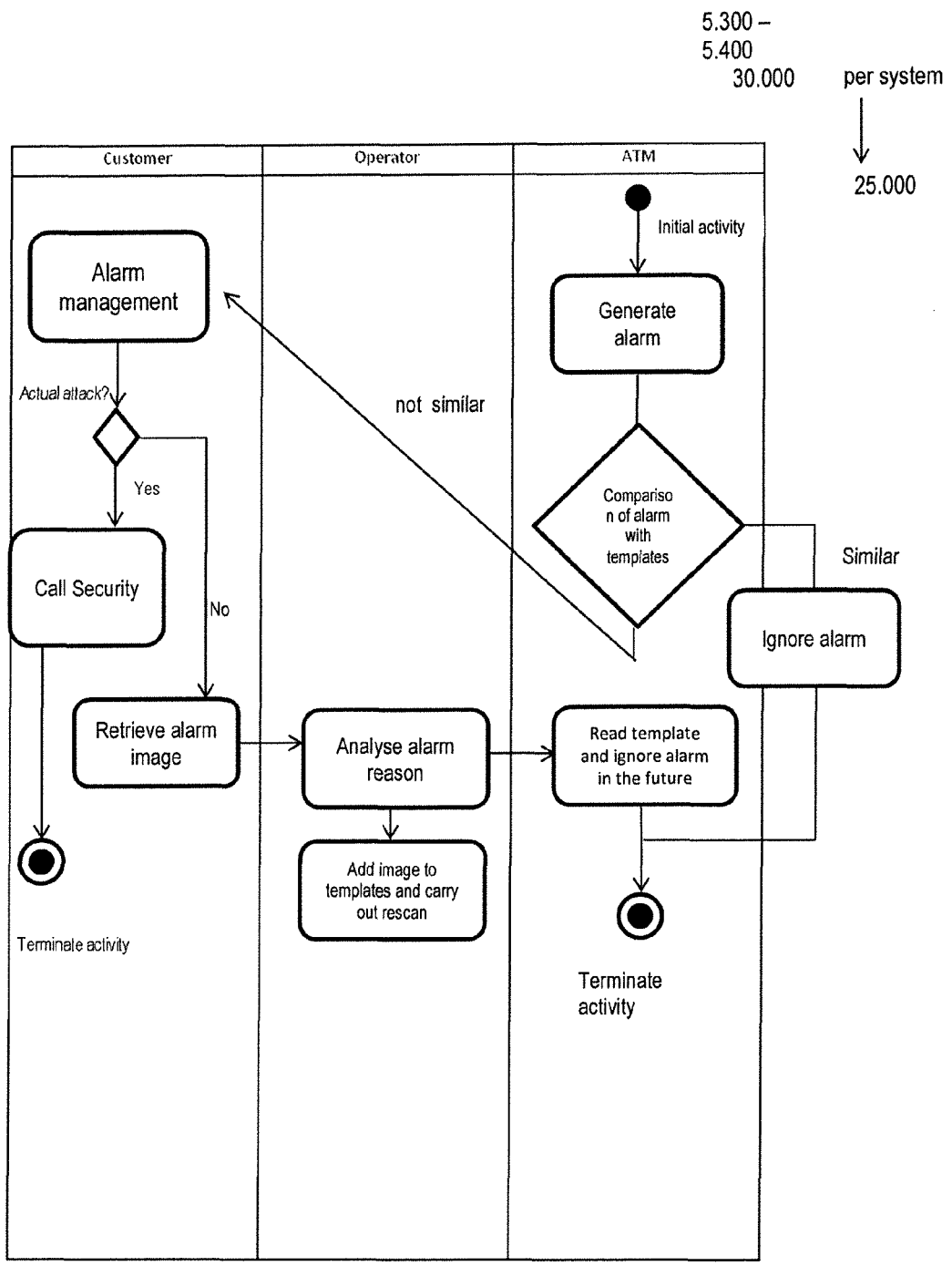
FIG. 1 shows the sequence of the method.

A basic operation is to copy the corresponding template files from the manipulation directory into the template directory and trigger a template rescan using the command "os_ctrl.exe". In this way, the information of the false alarms is saved as templates. To improve operation, the user is given an additional option on the user interface which reads "Add to templates". Furthermore the user interface has an area which allows a user to administer the templates.

Template files contain a manipulation report which may be added to the system templates. Any manipulation detected by the system automatically generates a preparatory template file which must later be added to the active templates. This template file is preferably stored in a separate directory.

The files administered by a module or library should be able to be managed and identified transparently for the user. In one possible case, these are images which are identified by viewing the image or video.

The format of the template files should be based on BMP, PNG or JPEG (other formats are also possible), and they should contain the following additional information in the metadata:
   camera information (in particular serial numbers)
   camera calibration information (image extract, resolution, aperture, exposure, automatic settings, white balance)
   date of generation of all preprocessed images used as input for manipulation detection
   manipulation history information
   preferably no portrait images except when manipulation has been detected by a portrait camera.

On the basis of this camera information and the camera calibration information, templates may be ignored if the camera is operating with parameters which differ from those used when recording the templates.

On the basis of the preprocessed images, the lighting is corrected, noise removed, shadows detected etc.

The manipulation history gives an overview of the manipulations previously detected. These also include the false alarms which should now be avoided.

On the basis of these templates, no alarm is triggered if a similar such template exists, even if this would be the case without the template.

On system configuration, the device engineer can activate a mode in which all manipulations detected are stored in the template folder for a specific period. In this way, work on the device can be secured and configurations can be carried out on the basis of these templates. Due to the manipulations collected in this way, the engineer, using a specific program e.g. "os_ctrl.exe", can switch to an automatic template mode such as to be applied for example for camera calibration.

This automatic template generation serves to teach the device or to integrate a new camera. On the basis of these templates, in the future anomalies are detected for example if the camera has been exchanged by a person unauthorised to do so. In auto-generation mode, alarms are collected and saved directly as templates. On an unauthorised exchange of camera, it is then detected from the old templates that certain serial numbers or different calibration information no longer correlate, so that this can also give rise to an alarm. An engineer however who is authorised to exchange the camera must therefore produce a number of reference templates. In a preferred embodiment, these automatically generated templates are also marked accordingly, to prevent these templates from triggering an alarm. Rather these templates should serve to provide metadata for the camera in order to be able to identify a manipulation of the camera.

In a further preferred embodiment, the automatically generated templates may be deleted on a legal camera exchange, in order for these to be generated afresh later. Here again a special command can be used. These automatically generated templates may be deleted if the calibration information is no longer current or if the serial number no longer correlates with the actual camera.

A plurality of cameras may be arranged in an ATM. These cameras are portrait, fascia/control panel or card reader cameras. The portrait camera records live images and adapts its exposure to the actual light conditions. As a result of these can be treated differently.

The ATM administers a so-called template database. This database consists of templates with images which e.g. are stored in a directory to identify situations in which no alarm is to be passed on even though it was detected by other components. Using the images contained therein, a comparison is made with the images assigned to an alarm and if a high correlation exists, the alarm is not passed on to the operator of the ATM.

As a result, an image similarity analysis is required to determine a similarity between a template and a current image which is associated with the alarm. Possible calculation methods are described below, but are not exclusively relevant.

For this a cross correlation is calculated. There are 2 images A, B, with m×n and c channels. The cross correlation (CC) is calculated as follows:

$$CC(A, B) = \sum_{k=1}^{c} \sum_{i=1}^{m} \sum_{j=1}^{n} (A[i,j]B[i,j]).$$

The CC of an image with itself is called autocorrelation. This normalised cross correlation NCC is calculated as follows:

$$NCC(A, B) = \frac{CC(A, B)}{\sqrt{CC(A,A)CC(B,B)}}.$$

The NCC is always a value between zero and one. It is equal to one if the two images are the same. The NCC between a completely white and a completely black image is zero. The normalisation step makes the measurement more robust against global lighting changes. However the calculation reacts very sensitively to local lighting changes, e.g. shadows.

For the squared Euclidean distance with two m×n images A and B with c channels, the squared Euclidean distance (SED) is calculated by $$SED(A, B) = \sum_{k=1}^{c} \sum_{i=1}^{m} \sum_{j=1}^{n} (A[i,j]B[i,j])^2.$$

A low Euclidean distance indicates a great similarity between the two images. If the two images are the same, the Euclidean distance is zero.

The normalised squared Euclidean distance (NSED) is calculated as follows:

$$NSED(A, B) = \frac{SED(A, B)}{\sqrt{CC(A,A)CC(B,B)}}$$

As in NCC, NSED has various advantages and disadvantages which must be taken into account according to the usage situation, in order to use the methods alone or combined.

A template is produced as a special image file in the case of an alarm or a camera calibration. This file contains for example one or more of the following items of information, or the other information listed above.

All available preprocessed images
aperture
edge image, colour image and other preprocessed images
Camera information
serial number
calibration at the area of interest
System information
such as serial number, model and configuration status.

Figure 2:
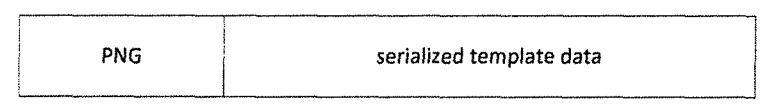

The template file itself consists of a PNG [10] image and the data listed above e.g. in serial format. One example is shown in FIG. 2.

The PNG shows the manipulation image which was taken during the manipulation event, or the extract image from the calibration. For the operating system of the ATM, this file appears as a standard PNG file so that a preview can be given with a standard image viewing system. The actual template data are generated by serialisation of the above-mentioned information and attachment to the PNG data. The serialised data may then be compressed to reduce the file size. The PNG contents are separated from each other by delimitation using the tag <template_data>.

The template database instance is configured to a specific folder, its content then scanned and loaded into the memory using the rescan function. Depending on the similarity, also only some of the template images may be stored in the memory. Template files for which the camera information or calibration information does not match the current camera data, are ignored.

In a preferred embodiment, an API is produced which comprises a class for the database and a class for the templates. The database class in turn manages the instances of the template class. The template class allows access to the metadata and the image data as described above. Furthermore, similarity can be calculated in the template class.

For operation of the ATM there is a first step in which the templates are generated automatically.

The templates are generated automatically when
a camera has been successfully calibrated, or
a manipulation has been detected while the ATM is working in template generation mode.

Automatically generated templates have specific file names to allow identification. The calibration templates begin e.g. with the prefix calib, while auto templates begin with the prefix auto. Also the camera from which the image was taken may influence the file name. If e.g. CR is used, this refers to the camera for the card reader, while Fascia stands for the camera monitoring the input units such as the keypad or screen (also touchscreen). The remainder of the file name may consist of the date and time at which the file was generated. An optional index may be used to avoid duplicate file names.

On comparison of the templates, the alarm images are compared with the templates using one of the methods described above. The choice of method depends on the environment of the ATM.

One possible use could be the (non-normalised) squared Euclidean distance (SED) in combination with Gaussian filtration, or cross correlation (CC) with a "blended" image. A "blended" image is an image which is produced by combining several individual images, such as in HDR photography. The reason for this is that a template should actually only be applied under similar light conditions. The normalised methods tend to ignore certain global changes in the lighting. Template matching is preferably calculated on the whole image.

The template database comprises various options. Thus different comparison methods may be predefined. It may be determined whether a blurring is to be applied, and the threshold value for comparison using the comparison process may be determined.

HTTP Hypertext Transfer Protocol
JPEG Joint Picture Expert Group (usually used as a name for the respective image file format)
ONVIF Open Network Video Interface Forum
OSG Optical Security Guard
OSI Optical Security Interface
PNG Portable Network Graphics (an image file format)
SIT System Integration Test
SOAP XML-based network message protocol, originally "Simple Object Access Protocol"
SOP Service Operator Panel
STL Standard Template Library (part of the C++ Standard)
T/SOP Technician SOP
WNMV Wincor Nixdorf Machine Vision (a library that forms the basis of OSG)
ATM Automated Teller Machine

What is claimed is:

1. A self-service ATM, comprising a camera, an alarm unit that generates alarms when the ATM is attacked, a network connection to a network for passing on the alarms to a customer, with a device for avoiding false alarms that is configured to compare alarm images, generated in the case of an alarm, from the camera from which the alarm was derived, with templates stored on the ATM and that characterise a false alarm, and if a correlation with the templates can be established, to ignore the alarm; otherwise to pass on the alarm to a customer via the network connection and the network, wherein the template consists of image data and metadata, wherein the metadata comprise one or more of the following items of information:
a) information from the preprocessed images
    aperture
b) camera information
    serial number
    calibration at the area of interest
    camera measurements
c) system information of the ATM
    serial number
    model description,
    and wherein the metadata and image data are stored in a file and a template is defined, and wherein the device for avoiding false alarms is configured to use the metadata to influence the comparison.

2. The ATM of claim 1, wherein the device for avoiding false alarms is configured, on instruction, following reception of the alarm via the network and after an analysis of the alarm over the network, to generate a template on the ATM if the customer is of the opinion that this is a false alarm that is to be ignored in the future, in order then to convert the alarm images on the ATM into templates to avoid a similar alarm in the future.

3. The ATM of claim 2, wherein the device for avoiding false alarms is configured to compare the digital alarm images with templates, using one or more of:
cross correlation, CC,
normalised cross correlation, NCC,
squared Euclidean distance, SED,
normalised squared Euclidean distance, NSED.

4. The ATM of claim 2, wherein the device for avoiding false alarms is configured, for NSED, to apply a blurring of the images in which a filter, a Gaussian filter or other filter, can be used.

5. The ATM of claim 1, wherein the templates comprise several images, image series of videos that can be compared with alarm image series,
and/or wherein several images from different cameras are stored in the templates.

6. The ATM of claim 1, wherein the ATM can be switched into automatic template mode for calibration of the camera and for storage of the metadata for the camera.

7. A method for avoiding false alarms, the method comprising the steps of:
providing a self-service terminal enabling a user to conduct at least one self-service operation;
enabling the self-service terminal to communicate with an operator device via a network;
capturing at least one image in the vicinity of the self-service terminal;
comparing the at least one captured image with one or more image templates stored in memory, each of the one or more image templates representing a non-alarm or false alarm condition;
if it is determined that the at least one captured image substantially correlates with one of the image templates, then ignoring the at least one captured image;
otherwise, if it is determined that the at least one captured image does not substantially correlate with one of the image templates, then transmitting the at least one captured image to the operator device via the network to signal a possible alarm condition;
upon receiving the at least one captured image by the operator device, enabling an operator of the operator device to determine if the at least one captured image is a false alarm; and if the at least one captured image is determined to be a false alarm, then transmitting instructions from the operator device to the self-service terminal to store the at least one captured image in the memory as at least one additional image template representing at least one additional non-alarm or false alarm condition.

8. The method of claim 7, wherein the step of comparing the at least one captured image with one or more image templates utilizing a cross-correlation (CC) process, a normalized cross-correlation (NCC) process, a squared Euclidean distance (SED) process, and/or a normalized squared Euclidean distance (NSED) process.

9. The method of claim 8, wherein the NSED process includes a step of blurring the at least one captured image.

10. The method of claim 9, wherein the step of blurring includes the step of utilizing a Gaussian filter.

11. The method of claim 7, wherein the one or more image templates comprise image information and metadata, wherein the metadata includes information from pre-processed images, camera information, and/or system information of the self-service terminal, and wherein the step of comparing the at least one captured image with one or more image templates utilizes the metadata.

12. The method of claim 11, wherein the metadata further includes information regarding an aperture, serial number, and/or physical measurements of a camera used for capturing the at least one image and/or a serial number and/or model description of the self-service terminal.

13. The method of claim 7, wherein the step of capturing at least one image in the vicinity of the self-service terminal further comprises the step of capturing a plurality of images by a plurality of cameras.

14. The method of claim 7, further comprising an initial step of capturing a plurality of image templates and the storing the image templates in the memory when the self-service terminal is initialing installed or when at least one camera used to capture the at least one image is replaced.

15. A self-service device configured to enable a user to conduct at least one self-service operation, the self-service device comprising:
at least one camera configured to capture at least one image in the vicinity of the self-service terminal;
an alarm unit;
a network interface configured to enable communication with a remote device via a network;
a memory device configured to store a plurality of image templates representing non-alarm or false alarm conditions;
wherein the alarm unit is configured to compare the at least one captured image with the image templates;
wherein if the alarm unit determines that the at least one captured image substantially correlates with at least one of the image templates, then the alarm unit is configured to ignore the at least one captured image;
otherwise, if the alarm unit determines that the at least one captured image does not substantially correlate with at least one of the image templates, then the alarm unit is configured to transmit the at least one captured image to the remote device via the network to signal a possible alarm condition;
wherein, if the network interface receives an indication from the remote device that the at least one captured image is a false alarm, then the memory device is configured to store the at least one captured image as at least one additional image template representing at least one additional non-alarm or false alarm condition.

16. The self-service terminal of claim 15, wherein the self-service terminal is an automated teller machine (ATM).

17. The self-service terminal of claim 15, wherein the alarm unit is configured to compare the at least one captured image with the image templates utilizing a cross-correlation (CC) process, a normalized cross-correlation (NCC) process, a squared Euclidean distance (SED) process, and/or a normalized squared Euclidean distance (NSED) process.

18. The self-service terminal of claim 17, wherein alarm unit is configured to utilize the NSED process to blur the at least one captured image.

19. The self-service terminal of claim 18, wherein the alarm unit comprises a Gaussian filter to blur the at least one captured image.

20. The self-service terminal of claim 15, wherein the one or more image templates comprise image information and metadata, wherein the metadata includes information from pre-processed images, camera information, and/or system information of the self-service terminal, and wherein the alarm unit is configured to compare the at least one captured image with image templates utilizes the metadata.

21. The self-service terminal of claim 20, wherein the metadata further includes information regarding an aperture, serial number, and/or physical measurements of the at least one camera and/or a serial number and/or model description of the self-service terminal.

22. The self-service terminal of claim 15, wherein the at least one camera is configured to capture a plurality of image templates and the memory device is configured to store the captured image templates when the self-service terminal is initialing installed or when one of the at least one camera is replaced.

* * * * *